Jan. 26, 1937.  W. D. ANTRIM  2,069,125
COOKING VESSEL
Filed Nov. 10, 1936
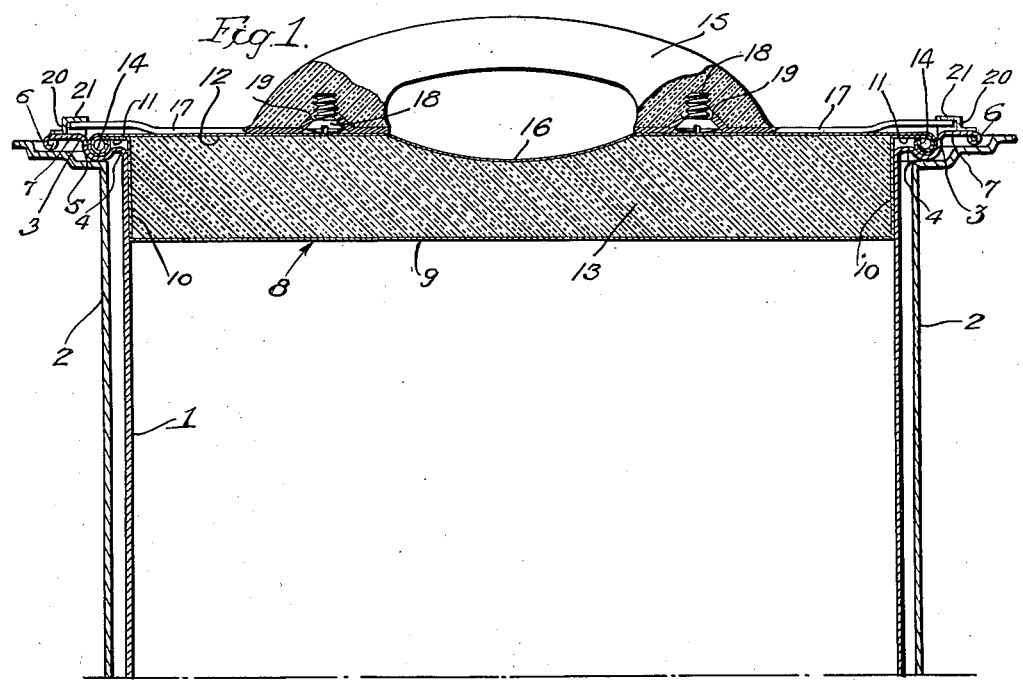
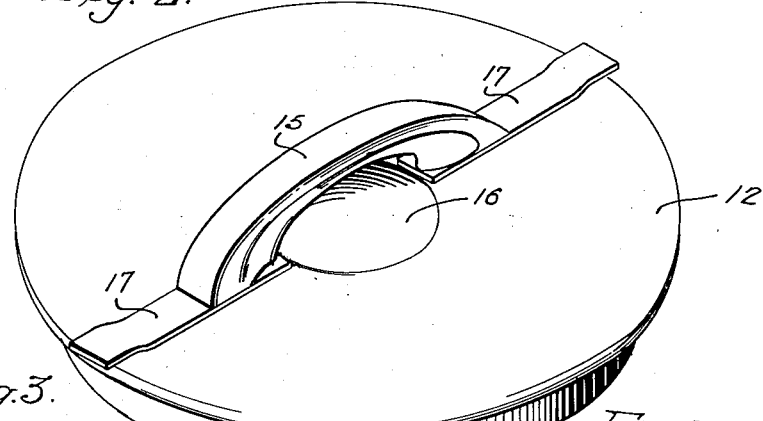
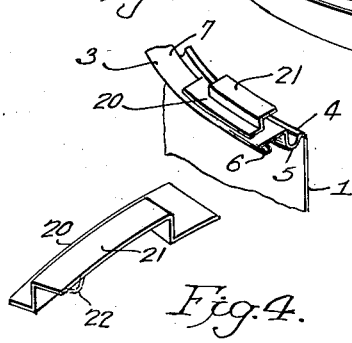
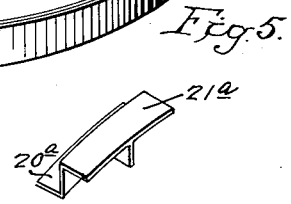
Inventor:—
William D. Antrim
by his Attorneys
Howson & Howson Patented Jan. 26, 1937

2,069,125

UNITED STATES PATENT OFFICE 2,069,125

COOKING VESSEL

William D. Antrim, Gloucester, N. J., assignor to Roberts & Mander Stove Company, Philadelphia, Pa., a corporation of Pennsylvania Application November 10, 1936, Serial No. 110,153

6 Claims. (Cl. 53—1)

This invention relates to new and useful improvements in cooking vessels and more particularly to cooking vessels for use in cookers of the so-called deep well type frequently embodied in gas or electric stoves and ranges.

The principal object of the present invention is to provide a cooking vessel of the character set forth having means for bodily lifting the vessel residing inwardly of the periphery of said vessel so as to be removed as far as possible from burners in the cooking top of a stove or range.

Another object of the invention is to provide a cooking vessel of the stated character having novel means for bodily lifting the vessel constructed and arranged so that closing of the cooking top cover or cover plate usually provided on present day gas or electric stoves and ranges of the cabinet type will not be interfered with.

These and other objects of the invention and the details of construction thereof are set forth hereinafter and shown in the accompanying drawing, in which:

Figure 1 is a fragmentary view in section diametrically through a cooking vessel made in accordance with this invention showing the same in relation to a cooker of the so-called deep well type.

Figure 2 is a view in perspective of the cover or lid of the vessel disclosed in Figure 1 showing certain details of construction thereof.

Figure 3 is a fragmentary view in perspective of the peripheral edge portion of the cooking vessel illustrating an essential feature of the invention.

Figure 4 is a detached view in perspective of the member or latch element for interconnecting the cover member and the vessel proper, and Figure 5 is a view similar to Figure 4 showing a modified form of the member or latch element disclosed in said Figure 4.

Referring now particularly to the drawing, reference numeral 1 designates a cooking vessel preferably composed of metal such as aluminum or the like constructed and arranged for use in deep well cookers the adjacent wall portions of which are designated in the drawing by reference numeral 2. A flange 3 projects outwardly from the upper or open end edge 4 of the vessel 1 and this flange 3 has a continuous channel 5 formed therein outwardly adjacent said edge 4 substantially midway between the latter and the outer peripheral edge portion of said flange which is turned under to provide a bead, lip or the like 6 for the purpose of strengthening the flange 3 and rendering the same substantially rigid. The portion of the flange 3 intermediate the channel 5 and the peripheral bead or lip 6 is substantially horizontal and affords a continuous flat or plane surface 7 which surrounds said channel 5.

A cover or lid 8 is provided and includes bottom and side wall portions 9 and 10 respectively formed to fit snugly within the upper or open end of the vessel 1. The side of wall portion 10 terminates at its upper end edge in an outwardly extending flange portion 11 which overlies the upper edge 4 as well as the outwardly adjacent portion of the flange 3 of the vessel and a top 12 of a diameter substantially equal to the outside diameter of the flange 11 overlies the latter and constitutes the upper surface of the cover or lid 8.

The space intermediate the top and bottom portions 12 and 9 respectively contains a suitable heat insulating material 13 and the peripheral edge portions of the flange 11 and top 12 are turned under as shown to form a bead or lip 14 arranged to engage and reside in the continuous channel 5 in the flange 3 to provide a substantially tight seal or joint between the cover or lid 8 and the vessel 1. As shown in the drawing, the flange 3 is formed so that the continuous flat surface 7 which surrounds the channel 5 resides in a plane slightly above said channel and upper edge 4 of the vessel so that when the bead or lip 14 of the cover 8 engages the channel 5 in flange 3, the upper surface of the top 12 of said cover 8 will reside substantially flush with or in the plane of said continuous flat surface portion 7 of said flange 3.

The cover 8 is also provided with a handle or grip member 15 located centrally of the top surface of said cover and the portion of the latter below said handle 15 is recessed as at 16 to provide sufficient clearance for the fingers of persons taking hold of the handle 15.

For the purpose of providing a suitable connection between the cover or lid 8 and the vessel 1 so that the latter may be withdrawn or lifted from the deep well cooker 2 by the handle or grip 15 of the former, strips or bars 17 are secured in any suitable manner to the upper surface of said cover 8 and arranged in alignment diametrically thereof so as to extend from opposite sides of the edge of the recess or depression 16 radially outward to points a short distance beyond the periphery of the cover. The bars or strips 17 may be secured to the surface of the cover 8 in any suitable manner and in the form of the invention illustrated these bars or strips 17 are secured directly to the surface of the top 12 of said cover axially of the handle or grip 15 which is secured in place by means of screws or the like 18 projecting upwardly through openings 19 in said strips 17 adjacent the inner ends thereof, it being necessary of course to first attach said handle 15 to the strips 17 by the screws 18 before said strips are secured to the surface of the top 12.

Brackets 20 are fixedly secured at diametrically opposite points on the continuous flat surface 7 of the flange 3 of the vessel 1 and include upwardly offset inwardly extending portions 21 spaced above and parallel to said surface 7 to form sockets or the like arranged to receive or be engaged by the projecting radial extremities of the strips or bars 17 when the cover or lid 8 is rotated with respect to the vessel 1 in a predetermined direction, said brackets 20 being constructed and arranged so that said sockets may be engaged by the ends of said strips 17 upon rotation of the cover 8 in but one direction. A modified form of bracket 20a is shown in Figure 5 of the drawing wherein the radial extremities of the bars or strips 17 may be engaged under the upwardly offset inwardly extending portion 21a of said brackets 20a by rotation of the cover 8 in either direction with respect to the vessel 1, and if desirable either form of bracket 20 or 20a may be provided with a suitable depending lip or ridge 22 (shown in dotted lines in Figure 4) located at the underside of the upwardly offset inwardly extending portions 21 or 21a thereof for the purpose of preventing accidental disengagement of the projecting elements 17 therefrom.

From the foregoing description of the invention it will be observed that by rotating the cover 8 to engage the radial extremities of the bars or strips 17 under the inwardly extending portions 21 or 21a of the brackets 19 or 19a, the entire vessel including the cover 8 may be withdrawn or lifted out of the deep well cooker 2 by merely grasping the handle 15 of said cover in the usual manner as though to lift the latter from the vessel to open the same. The present invention eliminates the necessity of providing the vessel 1 with suitable bales, handles or other means which might prevent or interfere with closure of cooking top covers or project into the flame area of adjacent burners in the cooking top of a stove or range.

While certain specific embodiments of the invention have been set forth herein for descriptive purposes, it is not intended that said invention shall be precisely limited thereto, but that changes and modifications in the construction and arrangement of parts may be incorporated within the scope of the annexed claims.

I claim:

1. A cooking vessel comprising a receptacle having a laterally projecting peripheral flange at the upper end thereof and a removable cover member constructed and arranged to fit snugly within said receptacle to close the same, said removable cover member including a hand grip and elements secured to the cover and extending beyond the periphery of said cover at opposite sides thereof and brackets secured on the peripheral flange of the receptacle at opposite sides thereof and including upwardly offset inwardly extending portions arranged to engage over said projecting elements of the cover when the latter is rotated relative to said receptacle so that the vessel may be lifted bodily by the handle of the cover alone.

2. A cooking vessel comprising a receptacle having a laterally projecting peripheral flange at the upper end thereof and a removable cover member constructed and arranged to fit snugly within said receptacle to close the same, said removable cover member including a hand grip and elements secured to the cover and extending beyond the periphery of said cover at opposite sides thereof and brackets secured on the peripheral flange of the receptacle at opposite sides thereof and including portions arranged to engage over said projecting elements of the cover when the latter is rotated relative to said receptacle so that the vessel may be lifted bodily by the handle of the cover alone.

3. A cooking vessel comprising a receptacle having a laterally projecting peripheral flange at the upper end thereof and a removable cover member constructed and arranged to fit snugly within said receptacle to close the same, said removable cover member including a hand grip and elements secured to the cover and extending beyond the periphery of said cover at opposite sides thereof and brackets secured on the peripheral flange of the receptacle at opposite sides thereof and including portions arranged to overlie said projecting elements of the cover when the latter is rotated relative to said receptacle so that the vessel may be lifted bodily by the handle of the cover alone.

4. A cooking vessel comprising a receptacle having a laterally projecting peripheral flange at the upper end thereof and a removable cover member constructed and arranged to fit snugly within said receptacle to close the same, said removable cover member including a hand grip and elements secured to the cover and extending beyond the periphery of said cover at opposite sides thereof, brackets secured on the peripheral flange of the receptacle at opposite sides thereof and including portions arranged to engage over said projecting elements of the cover when the latter is rotated relative to said receptacle so that the vessel may be lifted bodily by the handle of the cover alone, and means forming a part of each of said brackets constructed and arranged to prevent accidental disengagement of the projecting elements therefrom.

5. A cooking vessel comprising a receptacle having a laterally projecting peripheral flange at the upper end thereof and a removable cover member constructed and arranged to fit within said receptacle to close the same, said removable cover member including a hand grip and elements secured to the cover and extending laterally beyond said cover at spaced peripheral points and brackets secured at correspondingly spaced points on the flange of the receptacle and including portions arranged to engage over said projecting elements of the cover when the latter is rotated relative to said receptacle so that the vessel may be lifted bodily by the handle of the cover alone.

6. A cooking vessel comprising a receptacle having a laterally projecting peripheral flange at the upper end thereof and a removable cover member constructed and arranged to fit within said receptacle to close the same, said removable cover member including a hand grip and elements secured to the cover and extending laterally beyond said cover at spaced peripheral points and brackets secured at correspondingly spaced points on the flange of the receptacle and including upwardly offset inwardly extending portions arranged to engage over said projecting elements of the cover when the latter is rotated relative to said receptacle so that the vessel may be lifted bodily by the handle of the cover alone.

WILLIAM D. ANTRIM.